United States Patent
Samarasooriya et al.

(10) Patent No.: US 8,335,204 B2
(45) Date of Patent: Dec. 18, 2012

(54) WIRELESS LOCAL AREA NETWORK USING TV WHITE SPACE SPECTRUM AND LONG TERM EVOLUTION SYSTEM ARCHITECTURE

(75) Inventors: Vajira Samarasooriya, Ottawa (CA); Shiquan Wu, Nepean (CA)

(73) Assignee: Wi-LAN, Inc., Ottawa, CA (US)

( * ) Notice: Subject to any disclaimer, the term of this patent is extended or adjusted under 35 U.S.C. 154(b) by 645 days.

(21) Appl. No.: 12/363,319

(22) Filed: Jan. 30, 2009

(65) Prior Publication Data

US 2010/0195580 A1   Aug. 5, 2010

(51) Int. Cl.
 H04B 7/212 (2006.01)
(52) U.S. Cl. ........................................ 370/347; 370/337
(58) Field of Classification Search .......... 370/329–334, 370/335–338; 375/131
 See application file for complete search history.

(56) References Cited

U.S. PATENT DOCUMENTS

| | | | |
|---|---|---|---|
| 4,750,036 A | 6/1988 | Martinez | |
| 5,956,642 A | 9/1999 | Larsson et al. | |
| 6,327,300 B1 | 12/2001 | Souissi et al. | |
| 6,385,434 B1 | 5/2002 | Chuprun et al. | |
| 6,389,088 B1 | 5/2002 | Blois et al. | |
| 6,505,032 B1 | 1/2003 | McCorkle et al. | |
| 6,700,939 B1 | 3/2004 | McCorkle et al. | |
| 6,735,238 B1 | 5/2004 | McCorkle | |
| 6,859,506 B1 | 2/2005 | McCorkle | |
| 6,901,112 B2 | 5/2005 | McCorkle et al. | |
| 6,909,877 B2 | 6/2005 | Rofheart et al. | |
| 6,912,372 B2 | 6/2005 | McCorkle et al. | |
| 6,931,078 B2 | 8/2005 | McCorkle et al. | |
| 7,079,604 B1 | 7/2006 | Miller et al. | |
| 7,177,341 B2 | 2/2007 | McCorkle | |
| 7,292,622 B2 | 11/2007 | McCorkle | |
| 7,627,056 B1 | 12/2009 | Harris et al. | |
| 7,668,262 B2 | 2/2010 | Woo et al. | |
| 7,689,186 B2 | 3/2010 | Matoba et al. | |
| 7,710,919 B2 | 5/2010 | Woo et al. | |
| 7,852,868 B2 | 12/2010 | Gardner et al. | |
| 7,865,170 B2 | 1/2011 | Altizer et al. | |
| 7,969,311 B2 | 6/2011 | Markhovsky et al. | |
| 8,081,997 B2 * | 12/2011 | Sambhwani et al. | ......... 455/522 |
| 2001/0032225 A1 | 10/2001 | Tal et al. | |
| 2002/0086707 A1 | 7/2002 | Struhsaker et al. | |

(Continued)

FOREIGN PATENT DOCUMENTS

EP    1 750 466 A1    2/2007

(Continued)

OTHER PUBLICATIONS

International Search Report and Written Opinion as issued in International Patent Application No. PCT/CA2010/000126 on May 5, 2010, 8 pages.

(Continued)

*Primary Examiner* — Thai Hoang
(74) *Attorney, Agent, or Firm* — Procopio, Cory, Hargreaves & Savitch LLP

(57) ABSTRACT

A wireless local area network (WLAN) gateway may use a modified LTE radio frame and TV white space spectrum for data communications in a wireless local area network. In the modified LTE downlink frame a predefined subset of the pilot (reference) symbol subcarriers are used to carry information to data sinks in the WLAN.

20 Claims, 15 Drawing Sheets

U.S. PATENT DOCUMENTS

| | | |
|---|---|---|
| 2003/0021295 A1 | 1/2003 | Sahinoglu et al. |
| 2003/0096631 A1 | 5/2003 | Kayama et al. |
| 2004/0052228 A1 | 3/2004 | Tellado et al. |
| 2004/0085892 A1 | 5/2004 | Walton et al. |
| 2005/0156775 A1 | 7/2005 | Petre et al. |
| 2005/0254442 A1 | 11/2005 | Proctor, Jr. et al. |
| 2006/0008016 A1 | 1/2006 | Balakrishnan et al. |
| 2006/0067354 A1 | 3/2006 | Waltho et al. |
| 2006/0128428 A1 | 6/2006 | Rooyen |
| 2006/0203794 A1 | 9/2006 | Sampath et al. |
| 2006/0215606 A1 | 9/2006 | Yeon et al. |
| 2007/0087700 A1 | 4/2007 | Tanida |
| 2007/0091998 A1 | 4/2007 | Woo et al. |
| 2007/0100922 A1 | 5/2007 | Ashish |
| 2007/0115878 A1 | 5/2007 | Ashish et al. |
| 2007/0117537 A1 | 5/2007 | Hui |
| 2007/0133387 A1 | 6/2007 | Arslan et al. |
| 2007/0183591 A1 | 8/2007 | Geile et al. |
| 2007/0202867 A1 | 8/2007 | Waltho et al. |
| 2007/0223582 A1 | 9/2007 | Borer |
| 2007/0249341 A1 | 10/2007 | Chu et al. |
| 2008/0004839 A1 | 1/2008 | Papadimitriou et al. |
| 2008/0010208 A1 | 1/2008 | Callaway |
| 2008/0080604 A1 | 4/2008 | Hur et al. |
| 2008/0086286 A1 | 4/2008 | Shellhammer |
| 2008/0086749 A1 | 4/2008 | Goldberg et al. |
| 2008/0089281 A1 | 4/2008 | Yoon et al. |
| 2008/0089306 A1 | 4/2008 | Hu |
| 2008/0102822 A1* | 5/2008 | Feng et al. ............. 455/425 |
| 2008/0108366 A1 | 5/2008 | Hu |
| 2008/0112467 A1 | 5/2008 | Shellhammer |
| 2008/0130519 A1 | 6/2008 | Bahl et al. |
| 2008/0165680 A1 | 7/2008 | Chang |
| 2008/0165754 A1 | 7/2008 | Hu |
| 2008/0166974 A1 | 7/2008 | Teo et al. |
| 2008/0192686 A1 | 8/2008 | Cho et al. |
| 2008/0207136 A1 | 8/2008 | Tang et al. |
| 2008/0207204 A1 | 8/2008 | Vlantis et al. |
| 2008/0212725 A1 | 9/2008 | Tang |
| 2008/0259859 A1 | 10/2008 | Cordeiro et al. |
| 2008/0261639 A1 | 10/2008 | Sun et al. |
| 2008/0268832 A1 | 10/2008 | Peng |
| 2008/0268892 A1 | 10/2008 | Hamdi et al. |
| 2008/0293353 A1 | 11/2008 | Mody et al. |
| 2008/0293410 A1 | 11/2008 | Chan et al. |
| 2008/0299918 A1 | 12/2008 | Jallon et al. |
| 2008/0305750 A1 | 12/2008 | Alon et al. |
| 2009/0060001 A1 | 3/2009 | Waltho |
| 2009/0061887 A1 | 3/2009 | Hart et al. |
| 2009/0067354 A1 | 3/2009 | Gao et al. |
| 2009/0080389 A1 | 3/2009 | Messerges et al. |
| 2009/0086618 A1 | 4/2009 | Muschallik et al. |
| 2009/0124208 A1 | 5/2009 | Mody et al. |
| 2009/0144791 A1 | 6/2009 | Huffman et al. |
| 2009/0196180 A1 | 8/2009 | Bahl et al. |
| 2009/0197627 A1 | 8/2009 | Kuffner et al. |
| 2009/0235316 A1 | 9/2009 | Wu et al. |
| 2009/0247201 A1 | 10/2009 | Ye et al. |
| 2009/0296751 A1 | 12/2009 | Kewitsch et al. |
| 2010/0045876 A1 | 2/2010 | Gao et al. |
| 2010/0069013 A1 | 3/2010 | Chaudhri et al. |
| 2010/0075611 A1 | 3/2010 | Budampati et al. |
| 2010/0075704 A1 | 3/2010 | McHenry et al. |
| 2010/0091919 A1* | 4/2010 | Xu et al. ............. 375/346 |
| 2010/0124254 A1* | 5/2010 | Wu et al. ............. 375/131 |
| 2010/0166053 A1 | 7/2010 | Fukuhara et al. |
| 2010/0309317 A1 | 12/2010 | Wu et al. |
| 2010/0311341 A1 | 12/2010 | Gaddam et al. |
| 2011/0002309 A1* | 1/2011 | Park et al. ............. 370/335 |
| 2011/0150105 A1 | 6/2011 | Koga et al. |

FOREIGN PATENT DOCUMENTS

| | | |
|---|---|---|
| WO | 0223758 A1 | 3/2002 |
| WO | WO-2007-043827 | 4/2007 |
| WO | 2007060493 A2 | 5/2007 |
| WO | WO-2007-053196 | 5/2007 |
| WO | WO-2007-056081 | 5/2007 |
| WO | WO-2007-081503 | 7/2007 |
| WO | WO-2007-094604 | 8/2007 |
| WO | WO-2007-096819 | 8/2007 |
| WO | WO-2007-100323 | 9/2007 |
| WO | 2008014293 A1 | 1/2008 |
| WO | WO-2008-013429 | 1/2008 |
| WO | WO-2008-032999 | 3/2008 |
| WO | WO2008060203 | 5/2008 |
| WO | 2008090509 A2 | 7/2008 |
| WO | WO-2008-086243 | 7/2008 |
| WO | WO-2008-090506 | 7/2008 |
| WO | WO-2008-097253 | 8/2008 |
| WO | WO-2008-107854 | 9/2008 |
| WO | WO-2008-114216 | 9/2008 |
| WO | WO-2008-140417 | 11/2008 |
| WO | WO-2008-144323 | 11/2008 |
| WO | 2009114931 A1 | 9/2009 |

OTHER PUBLICATIONS

"IEEE starts standard to tap open regions in the TV spectrum for wireless broadband services" (IEEE) Oct. 12, 2004 from: http://standards.ieee.org/announcements/pr_80222.html, 3 pages.

Iancu, D., et al. Analog Television, WiMax and DVB-H on the Same SoC Platform.

Rhodes, C., Where are the White Spaces in the TV Broadcast Spectrum? May 17, 2008 at National Translator Association pp. 1-19.

Naveen, M.B., et al. WiMAX, pp. 1-20, http://ece-www.colorado.edu/~Liue/teaching/comm_standards/WiMax/WiMax_802_16e . . . , Date: Jul. 14, 2008.

International Search Report and Written Opinion as issued in International Patent Application No. PCT/CA2010/000823 on Oct. 26, 2010, 11 pages.

International Search Report and Written Opinion as issued in International Patent Application No. PCT/CA2010/000856 on Sep. 14, 2010, 8 pages.

International Search Report and Written Opinion for PCT/CA2009/000371, issued May 29, 2009, 9 pages.

International Search Report and Written Opinion from PCT/CA2009/001664 dated Feb. 1, 2010, 8 pages.

International Search Report and Written Opinion issued Dec. 17, 2009 in PCT/CA2009/001392, 6 pages.

Jones et al. "Initial Evaluation of the Performance of Prototype TV-Band White Space Devices." OET Report, FCC/OET 07-TR-1006, Tech. Rsch Br. Lab. Div. Office., Jul. 31, 2007 in 85 pages.

Liang, et al. "Cognitive Radio on TV Bands: A New Approach to Provide Wireless Connectivity for Rural Areas." Wireless Technologies Advances for Emergency and Rural Communications. 2008 IEEE Wireless Communications, Jun. 2008, pp. 16-22.

Marcus et al. "Report of the Unlicensed Devices and Experimental Licenses Working Group", Federal Communications Commission Spectrum Policy Task Force. Nov. 15, 2002. Internet Wayback Machine capture http://replay.waybackmachine.org/20041119020032/http://www.fcc.gov/sptf/files/E&UWGFinalReport.doc, Nov. 19, 2004, 24 pages.

Motorola et al., IEEE 802.22-06/0005r5, PHY Overview, Mar. 2006, 21 pages.

Iancu, D., et al. "Analog Television, WiMax and DVB-H on the Same SoC Platform." Proceedings of the International Symposium on System-on-Chip, Tampere, Finland. Nov. 2006.

Narlanka, S. et al. "A Hardware Platform for Utilizing TV Bands with a Wi-Fi Radio." 15th IEEE Workshop on Local & Metropolitan Networks, Jun. 10-13, 2007, pp. 49-53.

Naveen, M.B., et al. WiMAX. Jul. 14, 2008. pp. 1-20, http://ece-www.colorado.edu/~liue/teaching/comm_standards/WiMax/WiMax_802_16e . . .

* cited by examiner

WIRELESS LOCAL AREA NETWORK USING TV WHITE SPACE SPECTRUM AND LONG TERM EVOLUTION SYSTEM ARCHITECTURE

RELATED APPLICATIONS

This is the first application filed for this invention.

FIELD OF THE INVENTION

This invention relates in general to data communications within a wireless local area network (WLAN) and, in particular, to a WLAN using available TV white space spectrum and Long Term Evolution (LTE) system architecture for data communications.

BACKGROUND OF THE INVENTION

Data communication within WLANs is now generally accomplished using WiFi implemented using one of the IEEE 802.11 standards. The 802.11b and 802.11g standards are designed to operate in the 2.4 GHz band using Direct Sequence Spread Spectrum (DSSS) technology. The 802.11n standard is designed to operate in the 2.4 GHz or the 5 GHz bands.

While WiFi works well, the high frequency signals do not readily penetrate obstructions, so a high transmit power must be used. This has raised health concerns that remain unaddressed. Furthermore, the wireless distribution of new data-intensive services such as High Definition Television (HDTV) and multimedia communications signals can undesirably degrade WLAN performance; and, the quality of service (QoS) of the HDTV or multimedia signals can be adversely affected if the WLAN is simultaneously used for the delivery of other data intensive services, such as internet access.

A radio standard called Long Term Evolution (LTE) has been developed by the 3rd Generation Partnership Project (3GPP). The goals of LTE are the provision of an all Internet Protocol (IP) packet network with faster download and upload speeds and reduced latency.

FIG. 1 is a schematic diagram of an LTE generic downlink radio frame structure 100. Each downlink radio frame 100 includes twenty time slots 102 numbered from 0 to 19 having a duration of 0.5 ms each. Two adjacent time slots make up a subframe 104 having a duration of 1 ms. Each downlink frame 100 has a duration of 10 ms.

FIG. 2 is a schematic diagram of the structure of each LTE downlink time slot 102. The smallest time-frequency unit for downlink transmission is called a resource element 106, which constitutes one symbol on one sub-carrier. A group of 12 sub-carriers that are contiguous in frequency within the time slot 102 form a resource block 108. When the downlink frame structure 100 uses a normal cyclic prefix, the 12 contiguous sub-carriers in the resource block 108 have a sub-carrier spacing of 15 kHz with 7 consecutive symbols in each downlink time slot 102. The cyclic prefix is appended to each symbol as a guard interval. The symbol plus the cyclic prefix form the resource element 106. Consequently, the resource block 108 has 84 resource elements (12 sub-carriers×7 symbols) corresponding to one time slot 102 in the time domain and 180 kHz (12 sub-carriers×15 kHz spacing) in the frequency domain. The size of a resource block 108 is the same for all bandwidths. In the frequency domain, the number of available sub-carriers can range from 76 sub-carriers when the transmission bandwidth is 1.25 MHz, to 1201 sub-carriers when the transmission bandwidth is 20 MHz.

LTE has been designed to be very robust and supports data rates of up to 100+ Mbps on the downlink and 50+ Mbps on the uplink. Although it is optimized for user equipment travel speeds of 0-15 km/h, travel speeds of 15-120 km/h are supported with high efficiency. To accomplish this level of performance, "reference" or "pilot" symbols are inserted in predetermined resource element positions within each transmitted resource block 108. The pilot symbols are used by receiver channel estimation algorithms to correct for received signal distortions.

FIG. 3 is a schematic diagram of some of the pilot symbols 120 transmitted in the LTE downlink frame 100, for a single antenna case. The pilot symbols 120 are transmitted at OFDM symbol positions 0 and 4 of each time slot 102.

In May of 2004, the Federal Communications Commission (FCC) approved a Notice of Proposed Rulemaking to allow a new generation of wireless devices to use vacant television frequencies (TV white spaces) on an unlicensed basis. These TV white spaces are frequency channels allocated for television broadcasting that will not be used in given geographic areas after Feb. 17, 2009. Specifically, the FCC will allow unlicensed operation in the spectrum used by TV channels 5 and 6 (76-88 MHz); 7 through 13 (174-213 MHz); 14 through 36 (470-608 MHz); and, 38 through 51 (614-698 MHz).

Many proposals exist for using the unlicensed TV white space spectrum. For example, it has been suggested that Wireless Regional Area Networks (WRANs) could be established to provide high-speed internet access to single family dwellings, multiple dwelling units and small businesses. The WRANs would operate using the IEEE 802.22 architecture over the TV white space spectrum with a fixed deployment and a larger coverage (25~30 km range).

While these proposals have merit, they do not provide an efficient solution to the developing congestion in WLANs due to the emerging requirement to distribute HDTV signals wirelessly in a home environment. Furthermore, they do not provide interoperability with other systems or devices that use the LTE system architecture.

Therefore there exists a need for a local area network that uses the TV white space spectrum and the LTE system architecture.

SUMMARY OF THE INVENTION

It is therefore an object of the invention to provide a wireless local area network a method of data communications within the wireless local area network using the TV white space spectrum and the LTE system architecture.

The invention therefore provides a wireless local area network, comprising: a local area network gateway that transmits modified Long Term Evolution (LTE) downlink frames in which at least a predetermined subset of pilot symbol positions used in the LTE downlink frames to transmit pilot symbols for channel estimation are filled with control data symbols; and a data sink that receives the modified LTE frames and extracts the control data symbols from the predetermined subset of pilot symbol positions.

The invention further provides a local area network gateway comprising a transceiver that transmits modified Long Term Evolution (LTE) downlink frames in which a predetermined subset of the pilot symbols used for channel estimation in the modified LTE downlink frames maybe replaced with control data symbols.

The invention yet further provides a data sink in a local area network, comprising a Long Term Evolution (LTE) frame processor that processes modified LTE downlink frames transmitted by a local area network gateway and extracts control data from a subset of pilot symbol positions used to carry the control data in the modified LTE downlink frame.

The invention still further provides a method of data communications in a wireless local area network, comprising: transmitting within the wireless local area network modified Long Term Evolution (LTE) downlink frames in which at least a predetermined subset of the pilot symbol positions used in the LTE downlink frames to transmit pilot symbols for channel estimation are filled with control data symbols; and on receipt at a data sink in the wireless local area network of a one of the modified LTE downlink frames, demodulating the modified LTE downlink frame and extracting the control data symbols from the predetermined subset of the pilot symbol positions.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

The invention provides a wireless local area network (WLAN) in which a modified LTE downlink frame and the TV white space spectrum are used for data communications. A WLAN gateway is connected to at least one data source. The WLAN gateway wirelessly distributes source data and/or control data to a LTE transceiver or receiver associated with each data sink in the WLAN. In the modified LTE downlink frame a predefined subset of the pilot (reference) symbol positions are used to carry the control data to the data sinks. The source data (payload) capacity of each modified LTE radio frame is unaffected by the transmission of the control data, so control data may be distributed without affecting network throughput. The data capacity and the efficiency of the WLAN are thereby improved. The WLAN gateway has an effective transmit range of at upto 30 meters at a fraction of the transmit power of most 802.11 access point (AP) currently in use. The WLAN gateway can also operate in the same environment as an 802.11 AP without interference because of the significant difference in operating frequencies. The WLAN has many benefits and uses, including in-home wireless distribution of high definition television (HDTV) signals, and compatibility with other LTE systems and devices,.

Figure 4:
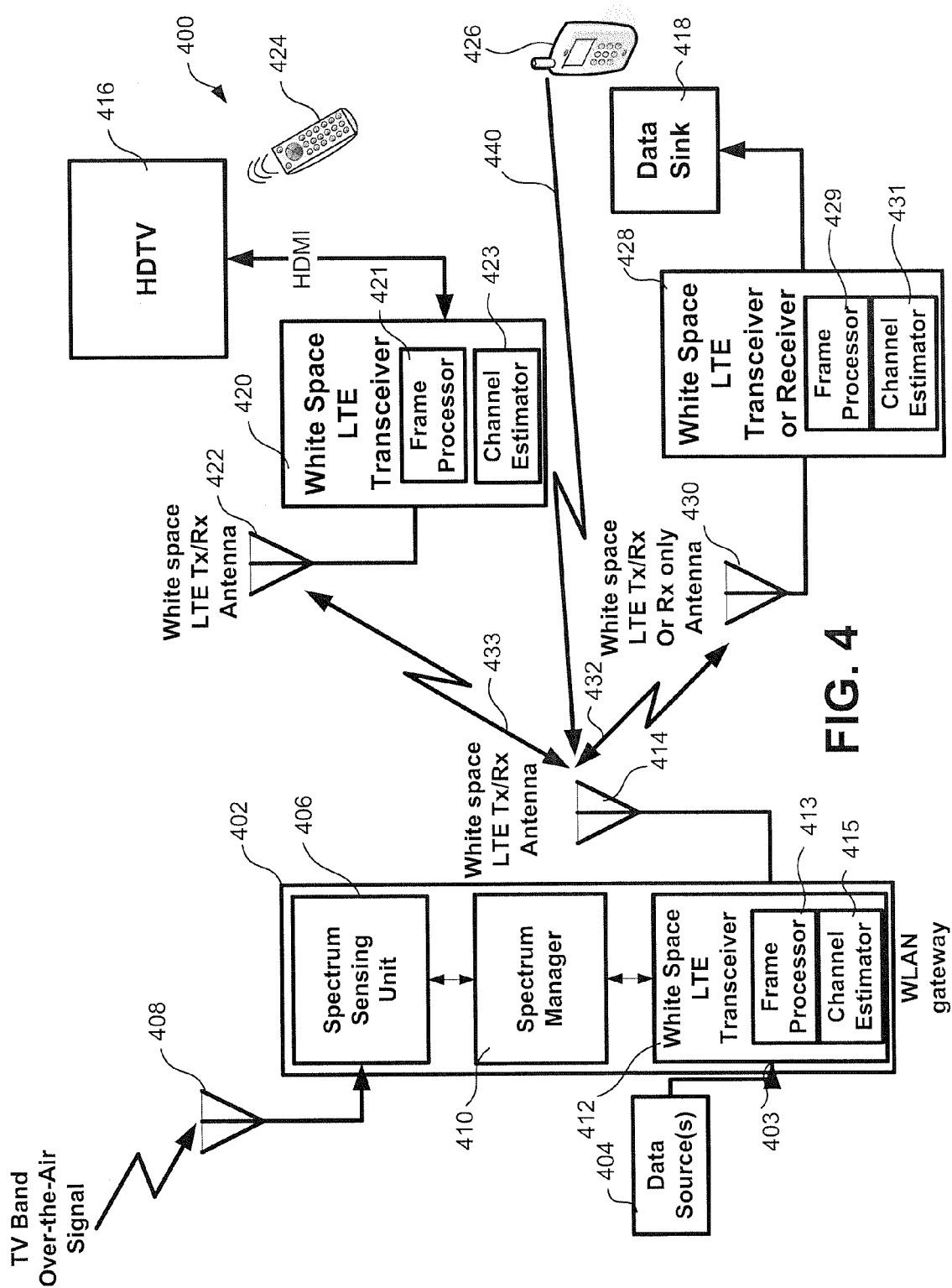
FIG. 4 is a schematic diagram of one embodiment of a WLAN in accordance with the invention.

FIG. 4 is a schematic diagram of a WLAN 400, in accordance with one embodiment of the invention. A WLAN gateway 402 has input ports 403 that are connected to at least one data source 404. The data source(s) 404 delivers "source data" to the WLAN 400.

The term "source data" means any information in any format derived from any data source 404, including but not limited to: customer premises equipment that receives any one or more of telephone, radio, television, multimedia, data or internet content in any protocol delivered via a telephone line, coaxial cable, optical fiber, microwaves, radio waves, television signals or satellite signals.

The WLAN gateway 402 includes a spectrum sensing unit 406 equipped with a spectrum sensing antenna 408. The spectrum sensing antenna 408 is used by the spectrum sensing unit 406 to detect over-the-air TV band signals in the TV white space spectrum. Information about the detected over-the-air TV band signals is passed by the spectrum sensing unit 406 to a spectrum manager 410. The spectrum manager 410 uses the detected signal information to select available TV white space spectrum for unlicensed use by the WLAN 400, as will be explained in more detail below with reference to FIG. 5.

The TV white space spectrum selected by the spectrum manager 410 is passed to a white space LTE transceiver 412, which receives, via a white space LTE Tx/Rx Antenna 414, source data requests sent from data sinks 416, 418 in LTE uplink frames (not shown). The LTE transceiver 412 distributes the source data in LTE downlink frames prepared by a frame processor 413. The LTE downlink frames are transmitted to the data sinks 416, 418 using the TV white space LTE Tx/Rx antenna 414.

The term "data sink" means any piece of user equipment in the WLAN 400 equipped with a TV white space LTE transceiver/receiver. A data sink may include, but is not limited to: any computer; any entertainment or home theatre component or device, including a HDTV; any commercial or household appliance; any environmental control system, device or sensor; any security control system, device or sensor; any entrance control system, device or sensor; or, any access control system, device or sensor.

The WLAN gateway 402 also distributes control data to the data sinks 416, 418, as required, using the white space LTE Tx/Rx antenna 414.

The term "control data" means any information in any format transmitted in a predetermined subset of pilot positions in the modified LTE downlink frames. The control data may communicate information of any kind to the data sink, and/or control the configuration, operation or behavior of the data sink. For example, the control data may be used to enable: an identification signal for co-existence of two or more WLANs 400 that operate in close proximity; provide a Consumer Electronic Control (CEC) compliant interaction channel with a home entertainment network; provide a High-bandwidth Digital Content Protection (HDCP) or Digital Transmission Content Protection (DCTP) type content protection scheme with Copy Protection for Recordable Media (CPRM) support; provide remote appliance or system control; or, permit remote monitoring of appliance or system output or status.

In this exemplary embodiment of the WLAN 400, the data sink 416 is a high definition television (HDTV). A white space LTE transceiver 420 associated with the HDTV 416 may be a stand-alone device, or connected to or incorporated into, for example, a television set-top box of any type, a DVD or a Blu-Ray player, or any other HDTV adjunct or controller. By way of example, the white space LTE transceiver 420, or the component to which it is connected, is connected to the HDTV by a High-Definition Multi-media Interface (HDMI). Any other suitable type of interface may also be used. The type of interface between the LTE transceiver 420 and the HDTV has no effect on the operation of the invention. The white space LTE transceiver 420 is provisioned with a frame processor 421. The frame processor 421 inspects received LTE radio frames for control data and source data addressed to the HDTV 416, as will be explained below in more detail with reference to FIGS. 5 and 6. The white space LTE transceiver 420 also has a channel estimator 423, which performs channel estimation, as will be explained below with reference to FIGS. 8-15. The white space LTE transceiver 420 is also equipped with a white space LTE Tx/Rx antenna 422 that provides a wireless link 433 to the WLAN gateway 400. The white space LTE Tx/Rx antenna 422 receives LTE radio frames transmitted by the WLAN gate 402 over the wireless link 433. The white space LTE transceiver 420 transmits source data requests to the WLAN gateway 402 over the wireless link 433 using LTE uplink frames (not shown), the description of which is not within the scope of this invention.

The HDTV 416 may be controlled directly by a remote control device 424, well known in the art. The HDTV 416 may also be controlled by any appropriate LTE-enabled device 426 (cellular telephone, PDA or the like) programmed to transmit control data (channel selection, volume control, input selection, on/off commands, etc.) to the white space LTE transceiver 420 via the white space LTE Tx/Rx antenna 414 of the WLAN gateway 402 using LTE uplink frames 440, the description of the which is not within the scope of this invention.

Figure 1:
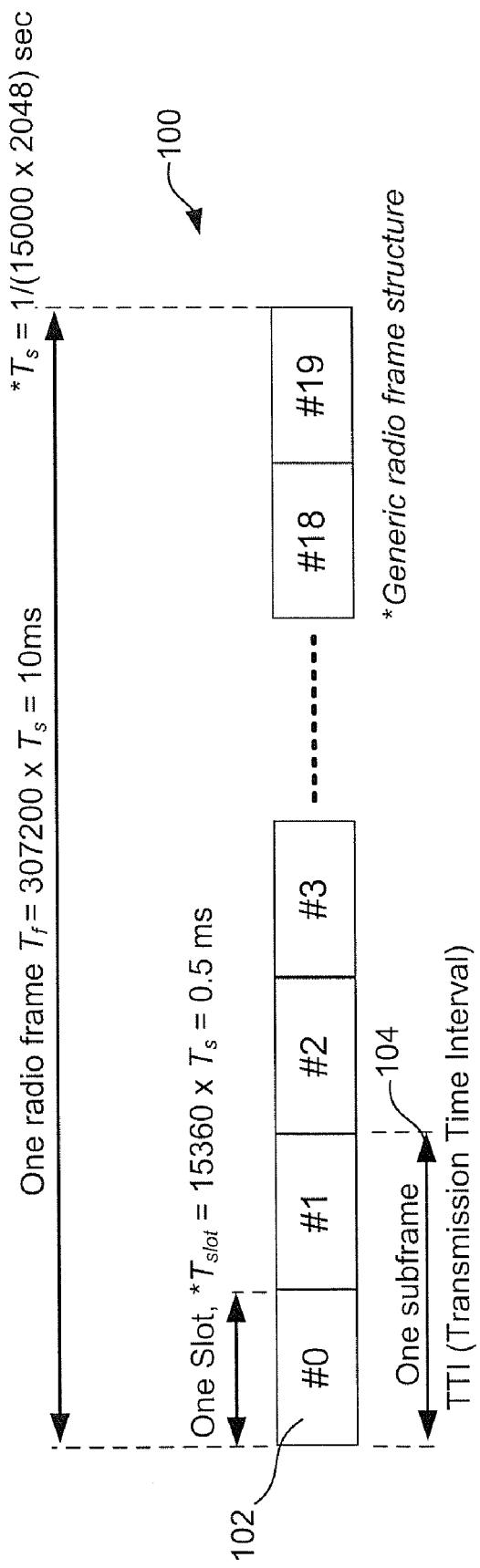
FIG. 1 is a schematic diagram of a prior art LTE downlink frame structure of type-1.
Figure 2:
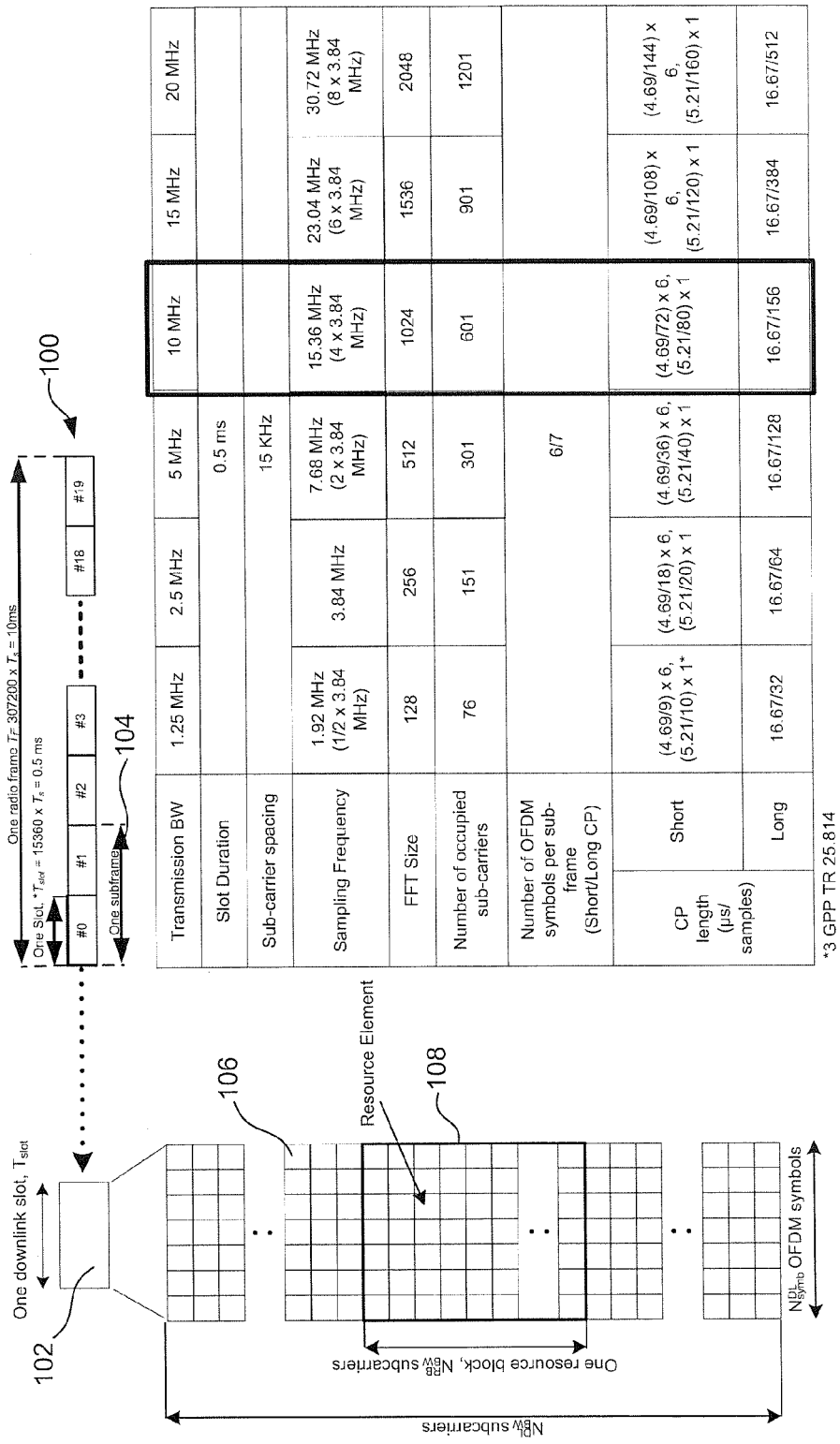
FIG. 2 is a schematic diagram of a prior art downlink slot structure for the downlink frame shown in FIG. 1.
Figure 5:
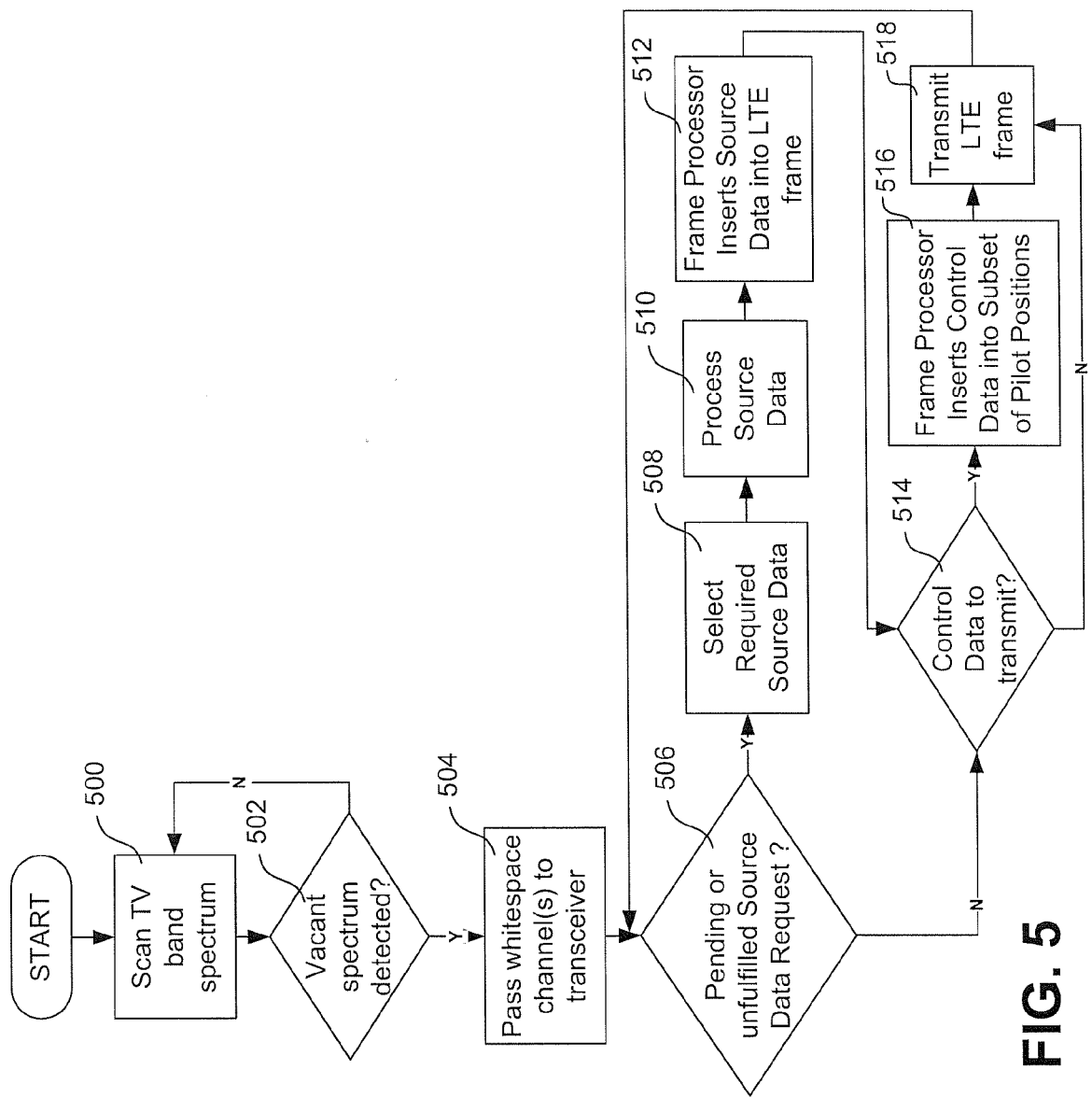
FIG. 5 is a flow diagram illustrating a high-level overview of some of the actions performed during startup and downlink frame processing by a WLAN gateway shown in FIG. 4.

The data sink 418 may be any computer, HDTV, appliance device or sensor, as defined above. A white space LTE transceiver or receiver 428 is connected to, or integrated into, the data sink 418. The LTE transceiver/receiver 428 is equipped with a frame processor 429. The frame processor 429 inspects received LTE frames for source data and/or control data addressed to the data sink 418, as will be explained below in more detail with reference to FIGS. 5 and 6. The LTE transceiver/receiver 428 is also provisioned with a channel estimator 431, which performs channel estimation, as will be explained below with reference to FIGS. 8-15. A white space LTE Tx/Rx or Rx only antenna 430 provides a wireless link 432 to the WLAN gateway 402. If the white space LTE transceiver/receiver 428 can process source data, it transmits source data requests to the WLAN gateway 402 over the wireless link 432 using LTE uplink frames, the description of which is not within the scope of this invention FIG. 5 is a flow diagram presenting a high-level overview of some of the functions performed on startup and downlink frame processing by the WLAN gateway 402 shown in FIG. 4. On startup, as described above, the spectrum sensing unit 406 scans the TV band spectrum (500) to detect unused spectrum in the predefined TV white space. The scan may be delimited by reference to a table or a database (not shown) that provides a list of channels that have been assigned to other TV white space services operating within a geographic area in which the WLAN 400 is located. After the TV band spectrum scan is complete the spectrum sensing unit 406 passes information about the scan to the spectrum manager 400 (see FIG. 1). In accordance with one embodiment of the invention, the spectrum sensing manager searches the scan information for a minimum of 5 MHz unused TV white space spectrum, but any other suitable piece of vacant white space spectrum can also be used. If a piece of vacant white space spectrum of a desired bandwidth is detected (502), information about that piece of white space spectrum is passed by the spectrum manager 410 to the LTE white space transceiver 412, as described above with reference to FIG. 4. After information about the available white space spectrum has been passed to the white space LTE transceiver 412, the WLAN gateway 402 begins the execution of an endless operation loop that terminates only when the WLAN gateway 402 is switched off.

In a first step of the endless operation loop, the WLAN gateway 402 determines whether there is a pending or unfulfilled source data request (506) received from any of the data sinks 416, 418 in the WLAN 400. If a pending or unfulfilled source data request exists, the required source data is captured (508) from an appropriate data source 404. The source data is then processed (510) by the frame processor 413 as required (demodulated and reformatted, for example) and inserted (512) by the frame processor 413 into a LTE downlink frame in accordance with the invention. The WLAN gateway 402 then determines (514) whether it has control data to transmit. If so, the frame processor 413 inserts (516) the control data into a predetermined subset of pilot positions in the modified LTE frame, as will be explained below with reference to FIG. 7. The WLAN gateway 402 then transmits (518) the LTE frame. If it is determined at 506 that no unfulfilled or pending source data request exists, the WLAN gateway 402 determines whether there is control data to transmit (514). If so, steps 516 and 518 are performed as described above. If there is no control data to transmit, an LTE frame containing idle cells is transmitted at 518.

Figure 6:
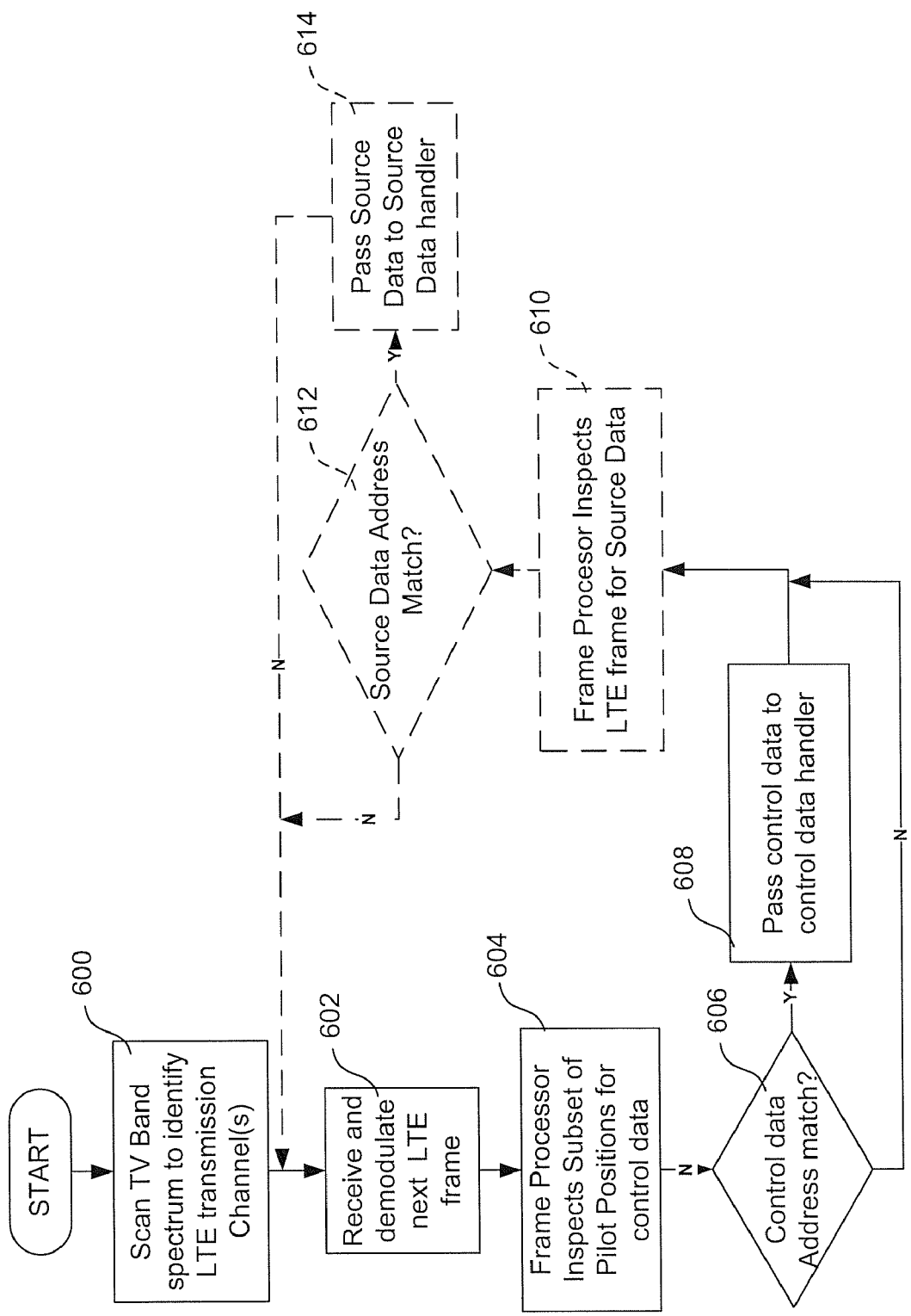
FIG. 6 is a flow diagram illustrating a high-level overview of some of the actions performed during startup and downlink frame processing by a WLAN receiver shown in FIG. 4.

FIG. 6 is a flow diagram presenting a high-level overview of some of the actions performed by the white space LTE transceivers/receivers 420, 428 shown in FIG. 4 during startup and frame processing. On startup the LTE transceiver/receiver scans (600) the TV band spectrum to identify TV white space transmission channel(s) currently being used by the WLAN gateway 402, using methods well known in the art. Once the TV white space channel(s) have been identified, the LTE transceiver/receiver begins an endless operational loop that terminates until the scheduled task being completed.

In a first step of the endless operational loop, the LTE transceiver/receiver receives and demodulates (602) the next transmitted LTE frame. The frame processor 421, 429 then inspects (604) a predefined subset of the pilot positions in the LTE frame to determine if the LTE frame carries control data. If control data exists there will be some identifier (address) in the control data to indicate its intended receiver. Consequently, the LTE transceiver/receiver tests (606) for an address match. The implementation of the address and the address match test is a matter of design choice. If there is an address match, the control data is passed (608) to a control data handler. If there is not an address match, the process proceeds to optional process 610, or loops back to 602.

Any given transceiver/receiver in the WLAN 400 may or may not be configured to process source data. Some transceivers/receivers, such as household appliances, etc. may only be configured to process control data. If the transceiver/receiver is configured to process source data, the frame processor 421, 429 inspects (610) the LTE frame for source data. If source data is present, the frame processor 421, 429 extracts the source data from the LTE frame. The frame processor then performs a source data address match test (612). As understood by those skilled in the art, the source data is delivered in internet protocol (IP) packets, the addressing of which is well known in the art. If it is determined that a source data address match exists, the source data is passed to a source data handler (614) and the process loops back to 602. Likewise, if as determined at 610 that the frame does not contain a source data packet, or it is determined at 612 that the source data address does not match that of the data sink 420, 428, the process loops back to 602.

Figure 3:
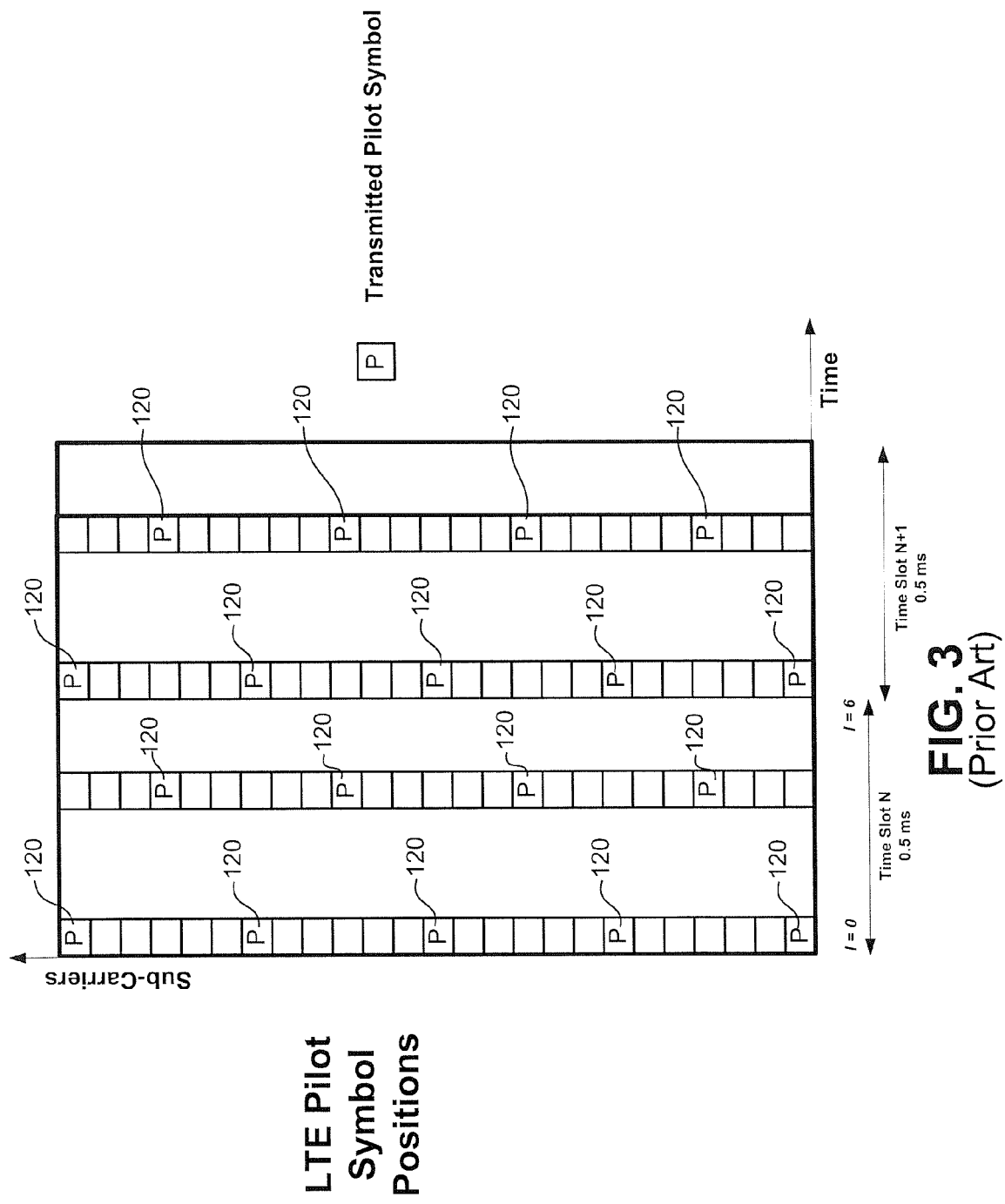
FIG. 3 is a schematic diagram of some of the pilot (reference) symbols transmitted in two of the prior art downlink slots shown in FIG. 2.
Figure 7:
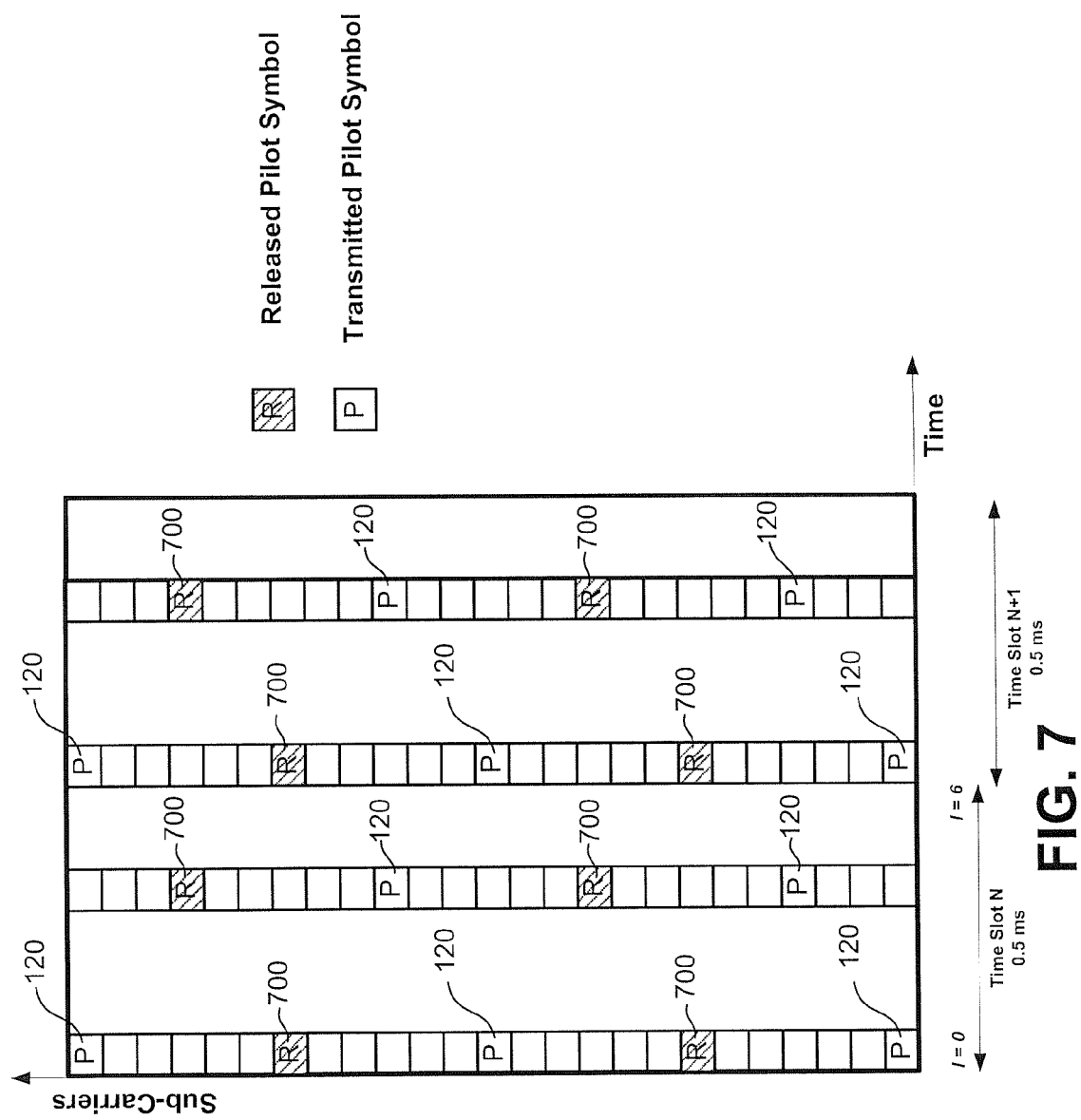
FIG. 7 is a schematic diagram of a proportion of the pilot symbols transmitted in a LTE downlink frame structure in accordance with the invention showing released pilot symbol positions used for control data transmission in the WLAN in accordance with the invention.

FIG. 7 is a schematic diagram of a proportion of the pilot symbols transmitted in the modified LTE downlink frame in accordance with the invention, showing released pilot symbol positions 700 used for control data transmission in the WLAN 400. As explained above with reference to FIG. 3, the LTE system architecture provides a very robust downlink structure designed to provide excellent QoS to highly mobile user devices. In the WLAN 400 environment, the wireless channel can be characterized as a slowly time-varying channel. Experimentation has established that the frequency and spacing of channel estimations in the standard LTE pilot (reference) symbol structure displays redundancy that can be exploited to enhance performance within the WLAN 400. A predetermined subset 700 of at least one half of the pilot positions 120 can be used to carry control data without adversely affecting QoS in the WLAN 400. To ensure a high level of QoS in the WLAN 400, channel estimation interpolation is performed in the frequency domain and the time domain to provide a channel estimate at each received symbol position in the modified LTE downlink frame, so that the predetermined subset of the pilot positions 700 can carry the control data.

Figure 8:
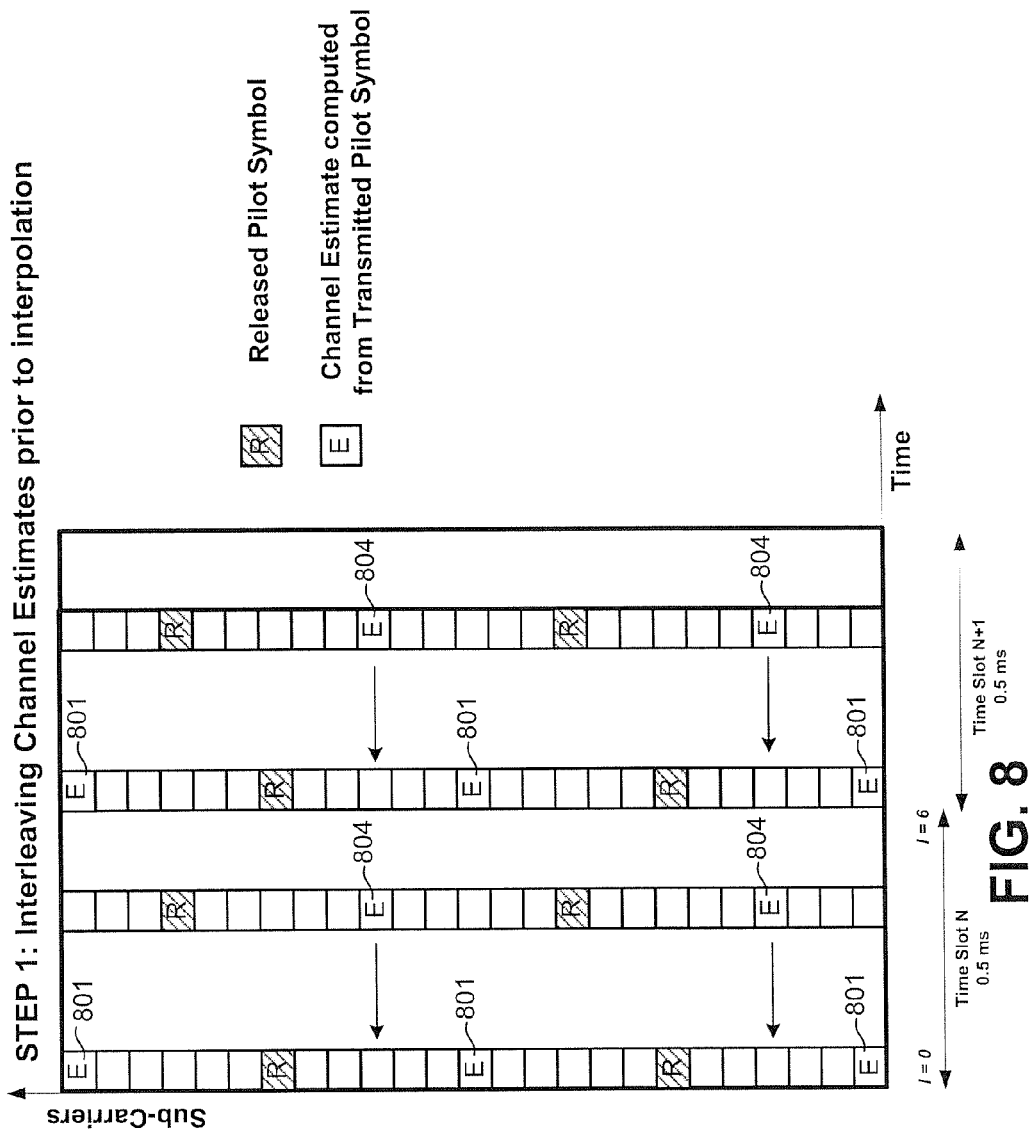
FIG. 8 is a schematic diagram illustrating a first step in one method of interpolating channel estimates using the LTE downlink frame structure in accordance with the invention.

FIG. 8 is a schematic diagram illustrating a first step in one method of interpolating channel estimates using the LTE downlink frame structure in accordance with the invention. In a first step of this method, channel estimates 801, 804 are computed for each existing pilot symbol in an LTE downlink frame received by an LTE transceiver/receiver in accordance with the invention. The channel estimates 804 in the $4^{th}$ symbol position are then interleaved with the channel estimates 801 in the $1^{st}$ symbol position, as shown in FIG. 8.

Figure 9:
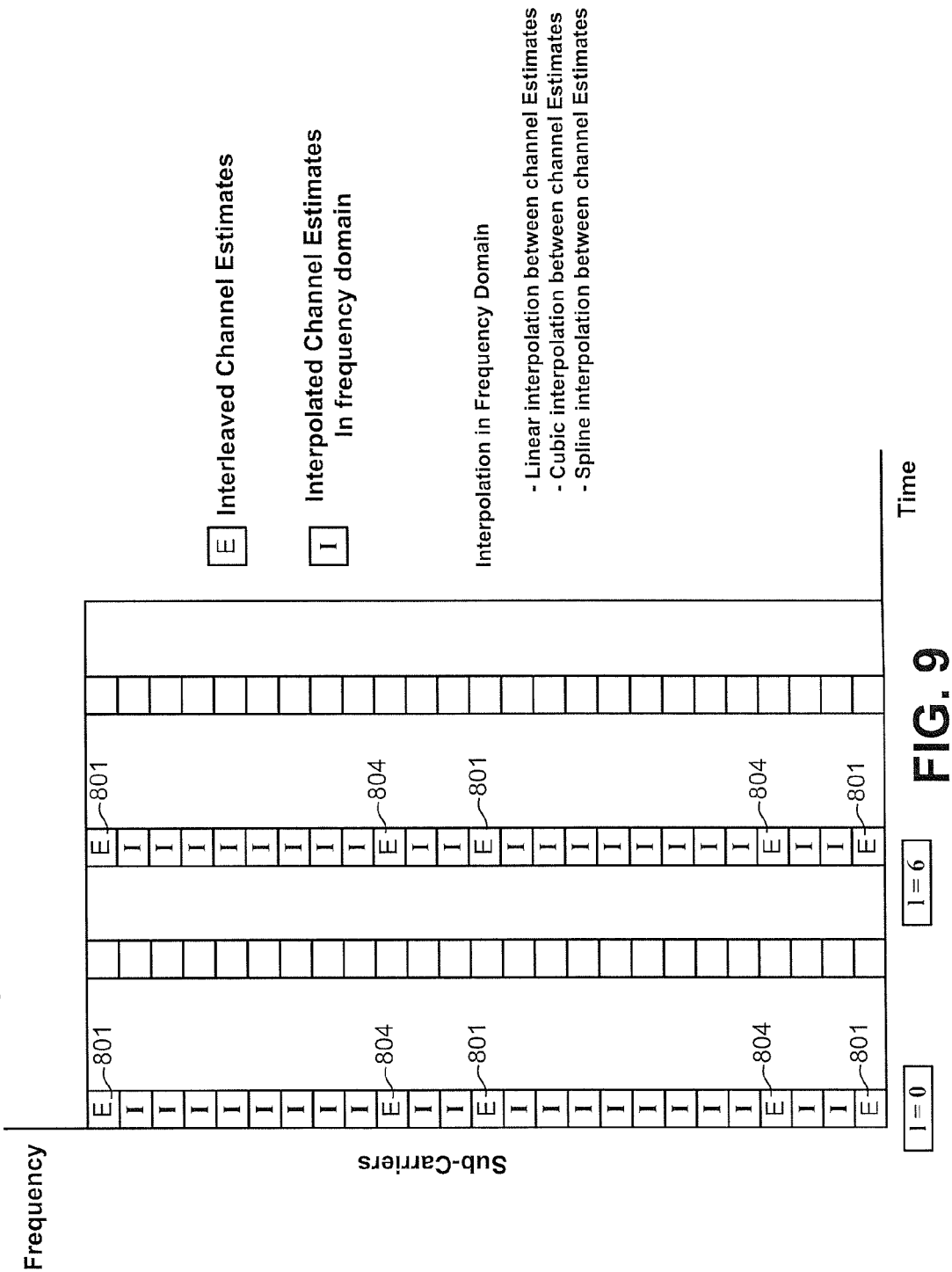
FIG. 9 is a schematic diagram illustrating the results of a second step in the method of interpolating channel estimates shown in FIG. 8.

FIG. 9 is a schematic diagram illustrating the results of a second step in the method of interpolating channel estimates shown in FIG. 8. In the second step, interpolation is performed in the frequency domain between the interleaved channel estimates. The interpolation in the frequency domain may be performed using, for example: a linear interpolation between channel estimates; a quadratic interpolation between channel estimates; or a spline interpolation between channel estimates, all of which are known in the art.

Figure 10:
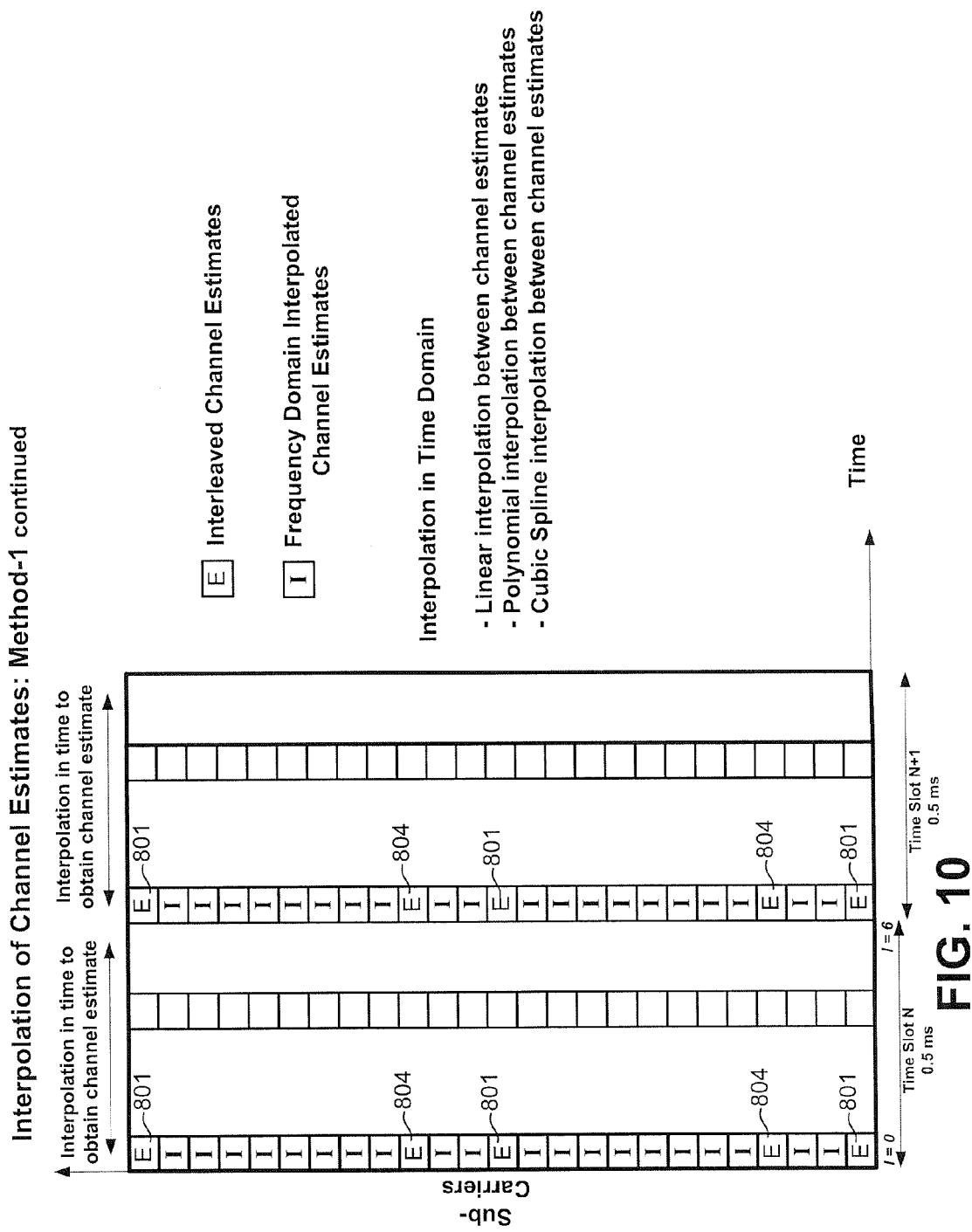
FIG. 10 is a schematic diagram illustrating a third step of the method of interpolating channel estimates shown in FIG. 8.

FIG. 10 is a schematic diagram illustrating a third step in the method of interpolating channel estimates shown in FIG. 8. After the channel estimates 801 are interleaved with the channel estimates 804 and the interpolation in the frequency domain has been completed, an interpolation in the time domain is performed to complete the channel estimate computations. The interpolation in the time domain may be performed using, for example: polynomial interpolation such as cubic spline interpolation between channel estimates, which is also known in the art.

Figure 11:
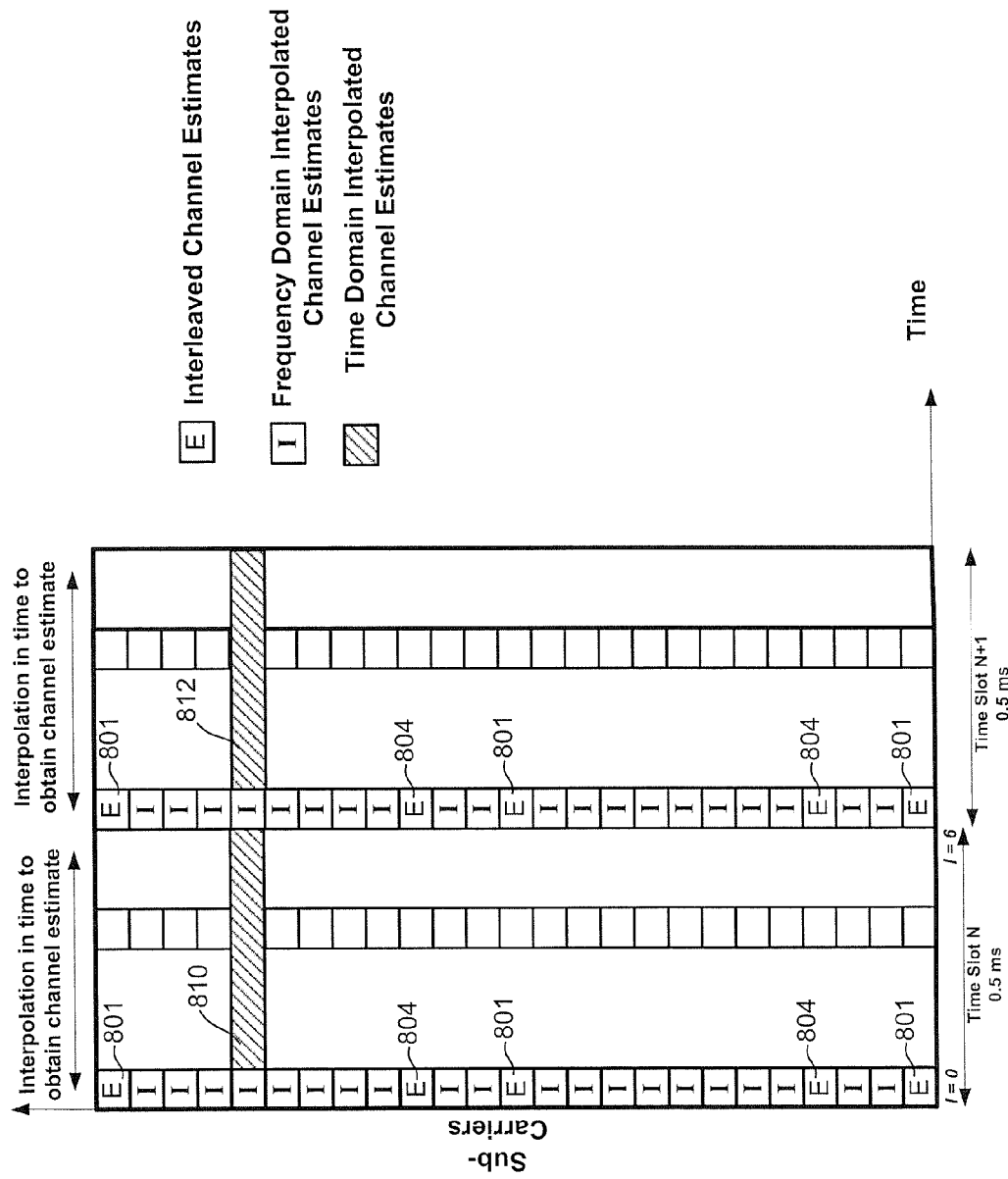
FIG. 11 is a schematic diagram illustrating the results of the second step of the method of interpolating channel estimates shown in FIG. 10.

FIG. 11 is a schematic diagram illustrating two results 810, 812 of the third step of the method of interpolating channel estimates in the time domain shown in FIG. 10 using linear, polynomial or cubic spline interpolation between frequency domain interpolations performed in the second step of this method. Although time domain interpolation is performed for all sub-carriers, and for the duration in time of the entire frame, for simplicity of illustration only the time domain interpolation for one sub-carrier in two time slots is shown.

Figure 12:
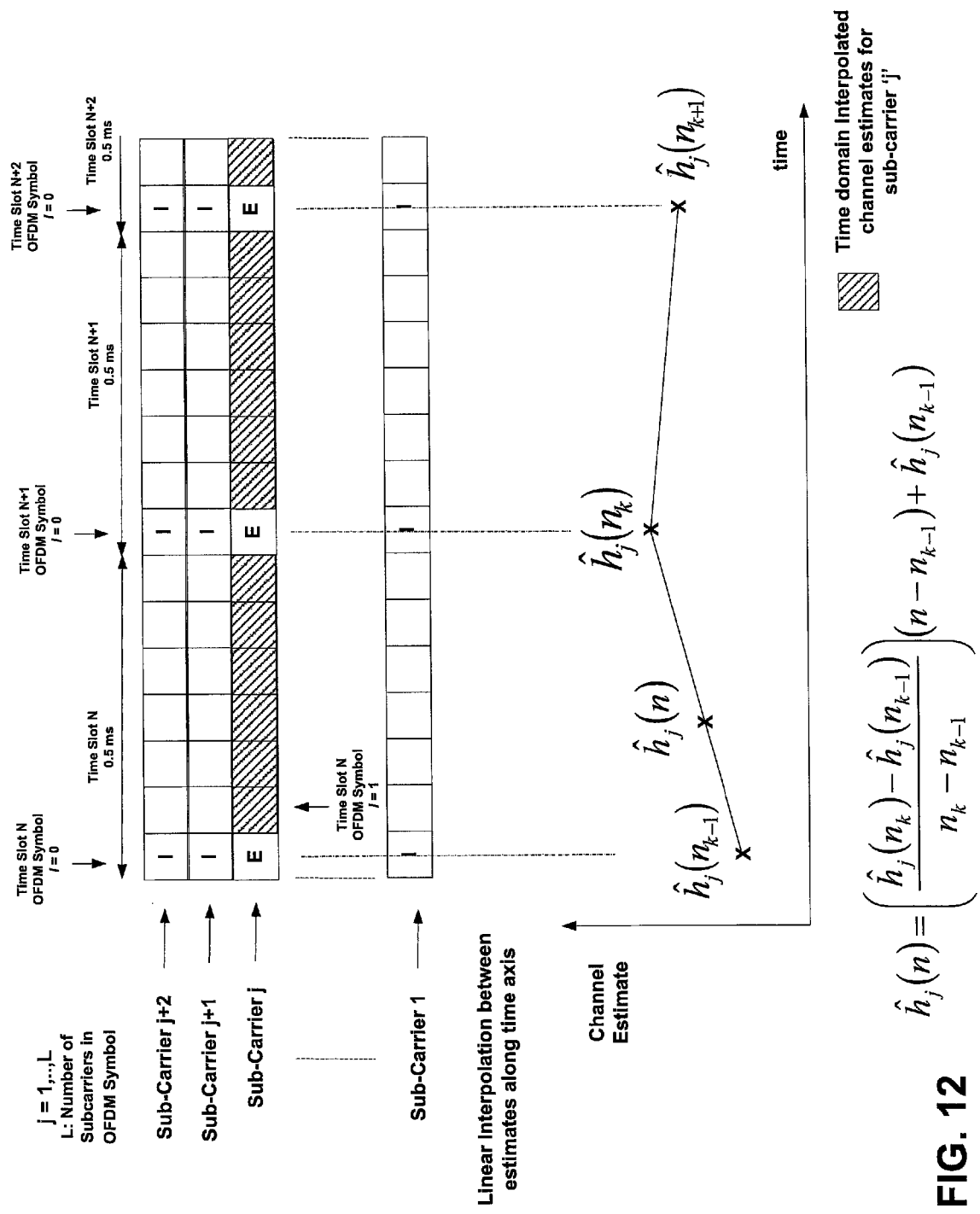
FIG. 12 is a schematic diagram illustrating a method of interpolating channel estimates in the time domain using linear interpolation between computed channel estimates.

FIG. 12 is a schematic diagram illustrating interpolation of channel estimates in the time domain using linear interpolation between computed (E) or frequency domain interpolated (I) channel estimates. The linear interpolation is performed using the known equation:

$$\hat{h}_j(n) = \left(\frac{\hat{h}_j(n_k) - \hat{h}_j(n_{k-1})}{n_k - n_{k-1}}\right)(n - n_{k-1}) + \hat{h}_j(n_{k-1})$$

where: $\hat{h}_j(n_k)$, $\hat{h}_j(n_{k-1})$ represent the computed (E) or frequency domain interpolated (I) channel estimates as illustrated in FIG. 9. $\hat{h}_j(n)$ represents the time domain interpolated channel estimates 810 computed using the above linear interpolation formula at positions illustrated in FIG. 11.

j=1, . . . , L, and L is the number of sub-carriers in the LTE frame.

Figure 13:
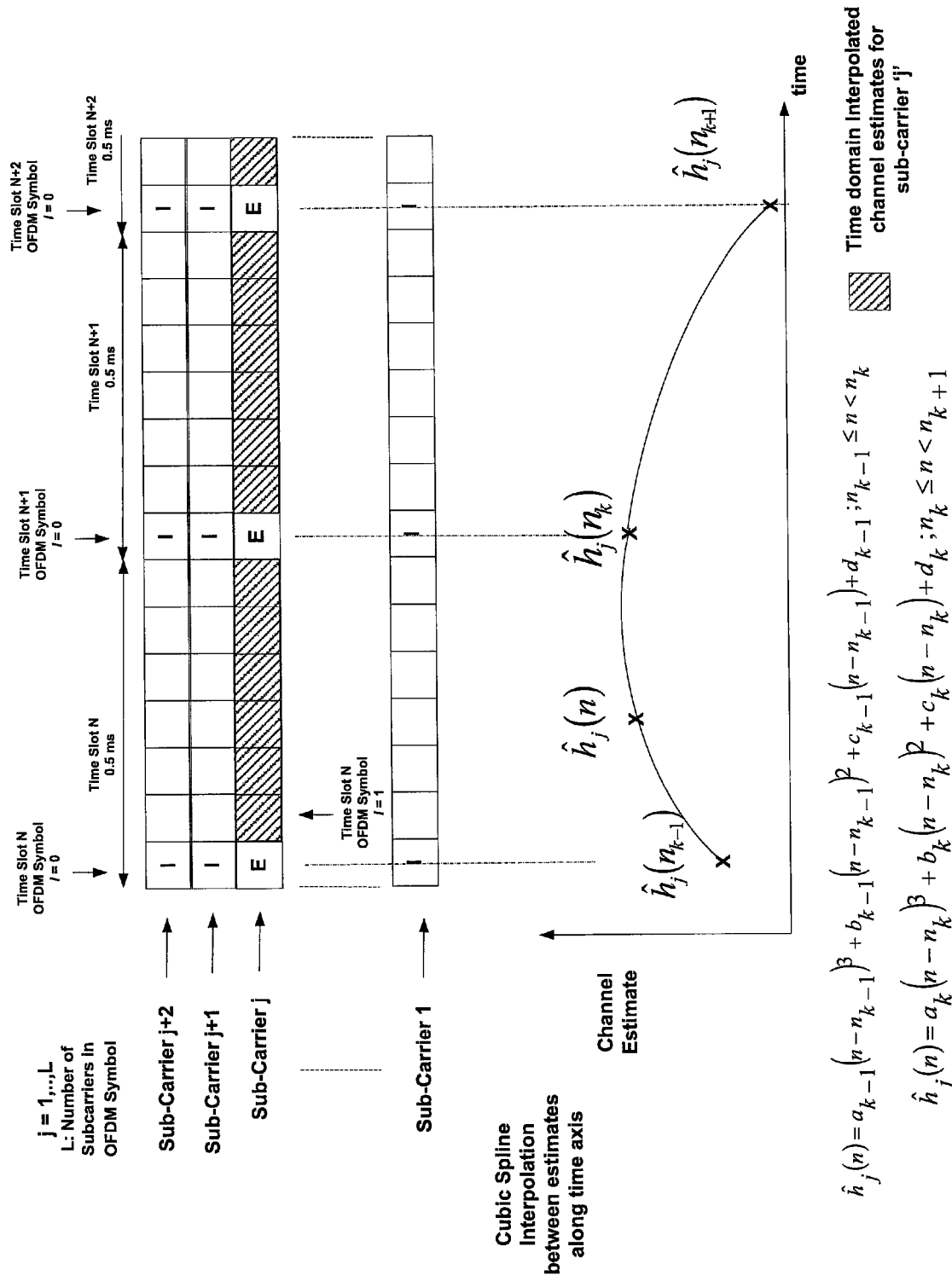
FIG. 13 is a schematic diagram illustrating a method of interpolating channel estimates in the time domain using cubic spline interpolation between computed channel estimates.

FIG. 13 is a schematic diagram illustrating interpolation of channel estimates in the time domain using cubic spline interpolation between computed and interpolated frequency domain channel estimates. The cubic spline interpolation is performed using the known equations:

$$\hat{h}_j(n) = a_{k-1}(n-n_{k-1})^3 + b_{k-1}(n-n_{k-1})^2 + c_{k-1}(n-n_{k-1}) + d_{k-1}; \; n_{k-1} \leq n < n_k$$

and $$\hat{h}_j(n) = a_k(n-n_k)^3 + b_k(n-n_k)^2 + c_k(n_k) + d_k; \; n_k \leq n < n_{k+1}.$$

where:

j=1, . . . , L, and L is the number of sub-carriers in the LTE frame.

Figure 14:
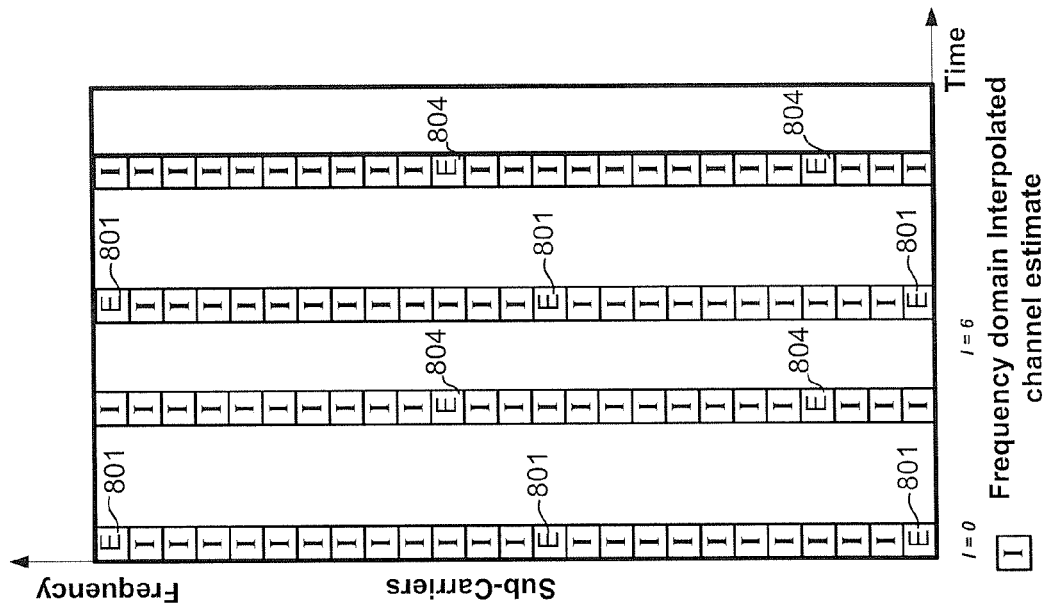
FIG. 14 is a schematic diagram illustrating a first step in another method of interpolating channel estimates using the LTE downlink frame structure in accordance with the invention, and the results of the first step.
Figure 14:
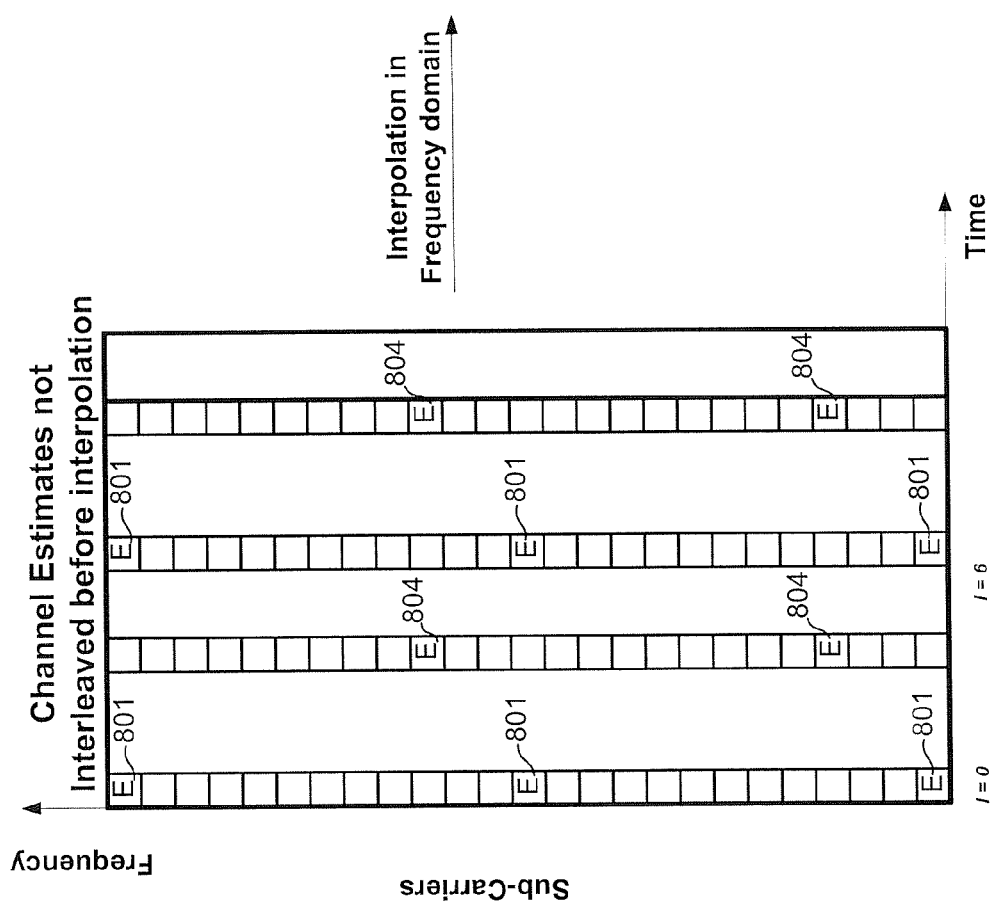

FIG. 14 is a schematic diagram illustrating a first step in another method of interpolating channel estimates using the modified LTE downlink frame structure in accordance with the invention, and the results of the first step in this method. In accordance with this method, interpolation in the frequency domain is performed without interleaving the channel estimates in the $4^{th}$ character position with those in the $1^{st}$ character position. Consequently, the channel estimates are computed at their transmitted pilot symbol positions. As noted above, the interpolation in the frequency domain can be performed using any known method, for example a polynomial interpolation such as cubic spline interpolation between channel estimates.

Figure 15:
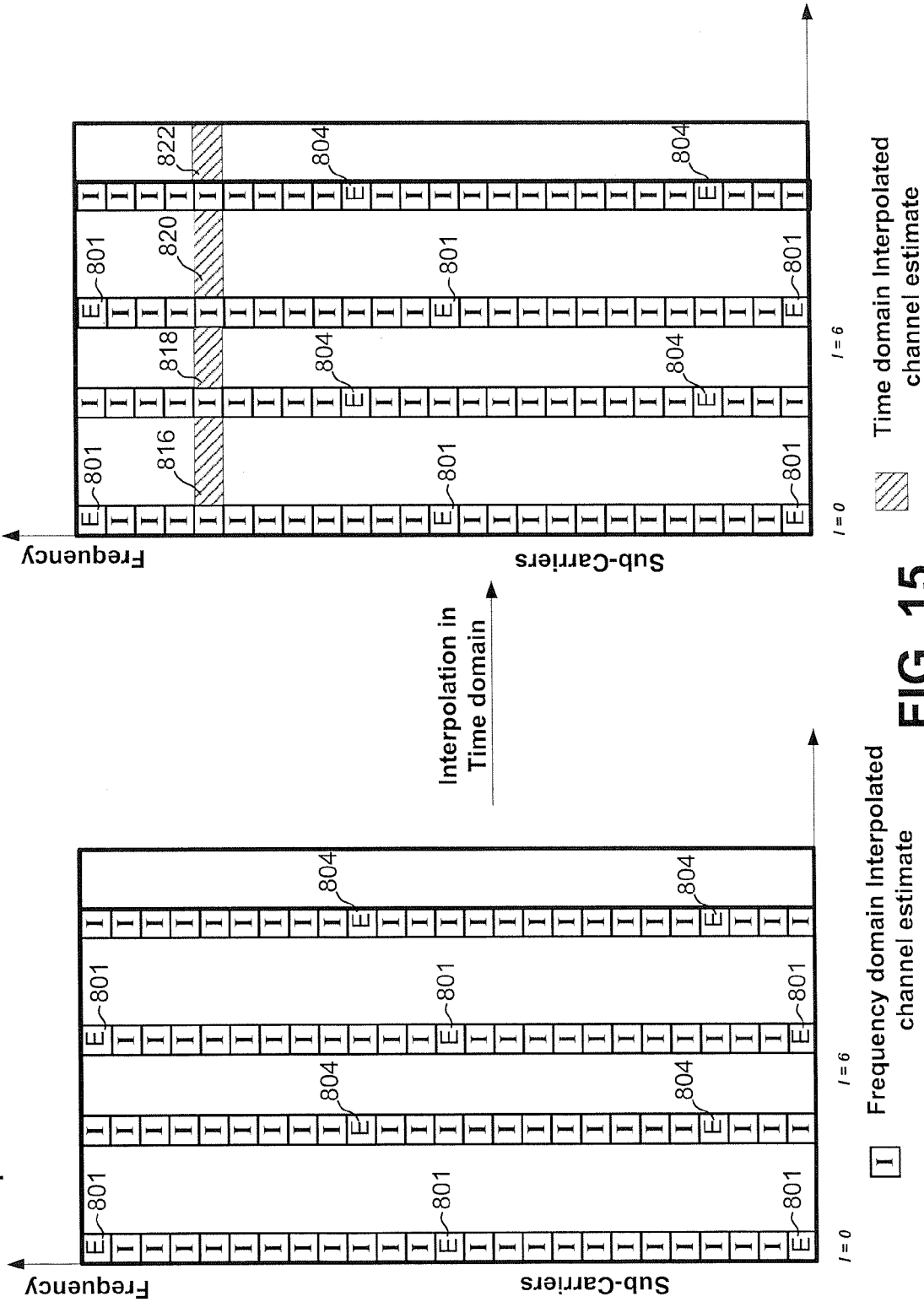
FIG. 15 is a schematic diagram illustrating the results of the first step of the method of interpolating channel estimates shown in FIG. 14, and a second step in that method of interpolating the channel estimates in the time domain.

FIG. 15 is a schematic diagram illustrating the results of a second step of the method shown in FIG. 14, in which the channel estimates are interpolated in the time domain. Although time domain interpolation is performed for all sub-carriers, and for the duration in time of the entire frame, for simplicity of illustration only the time domain interpolation for one sub-carrier in two time slots is shown. In the first time slot, the interpolations 816 and 818 are computed. In the second time slot, the interpolations 820 and 822 are computed. As noted above, the interpolation in the time domain can be performed using any one of: linear interpolation between channel estimates; polynomial interpolation between channel estimates; or, cubic spline interpolation between channel estimates.

The embodiments of the invention described above are only intended to be exemplary of the WLAN 400, WLAN gateway 402, the data sinks 416, 418 and the modified LTE downlink frame structure in accordance with the invention, and not a complete description of every possible configuration of any one of those. The scope of the invention is therefore intended to be limited solely by the scope of the appended claims.

We claim:

1. A wireless local area network, comprising:
a local area network gateway that transmits a modified Long Term Evolution (LTE) downlink frame in which a predetermined subset of pilot symbol positions used in LTE downlink frames to transmit pilot symbols for channel estimation are used to carry control data symbols to increase a data capacity of each of the LTE downlink frames; and
a data sink that receives the modified LTE downlink frame and extracts the control data symbols from the predetermined subset of pilot symbol positions.

2. The wireless local area network as claimed in claim 1 wherein the local area network gateway comprises a TV white space transceiver for transmitting the modified LTE downlink frame over available TV white space spectrum.

3. The wireless local area network as claimed in claim 2 wherein the local area network gateway further comprises a spectrum sensing unit equipped with an antenna for sensing TV band over-the-air signals.

4. The wireless local area network as claimed in claim 3 wherein the local area network gateway further comprises a spectrum manager that receives from the spectrum sensing unit information about the sensed TV band over-the-air signals and selects the available TV white space spectrum for transmitting the modified LTE downlink frame.

5. The wireless local area network as claimed in claim 2 wherein the data sink comprises a TV white space receiver for receiving the modified LTE downlink frame transmitted by the local area network gateway.

6. The wireless local area network as claimed in claim 1 wherein the data sink further comprises a frame processor that demodulates the modified LTE downlink frame and extracts the control data symbols from the predetermined subset of pilot positions.

7. The wireless local area network as claimed in claim 1 wherein the data sink comprises a channel estimator for computing channel estimations using pilot symbols in the modified LTE downlink frame, and interpolation algorithms that interpolate the computed channel estimations in the frequency domain and the time domain to provide a channel estimate at each received symbol position in the modified LTE downlink frame.

8. A local area network gateway comprising a transceiver that transmits a modified Long Term Evolution (LTE) downlink frame in which a predetermined subset of the pilot symbols used for channel estimation in the LTE downlink frames are replaced with control data symbols that carry control information to a data sink in the local area network.

9. The local area network gateway as claimed in claim 8 wherein the transceiver is a TV white space transceiver that uses TV white space spectrum for transmitting the modified LTE downlink frame.

10. The local area network gateway as claimed in claim 9 further comprising a spectrum sensing unit equipped with an antenna for sensing TV band over-the-air signals.

11. The local area network gateway as claimed in claim 10 further comprising a spectrum manager that receives information about the sensed TV band over-the-air signals from the spectrum sensing unit and selects available TV white space spectrum for transmitting the modified LTE downlink frame.

12. A data sink in a local area network, comprising a Long Term Evolution (LTE) frame processor that processes modified LTE downlink frames transmitted by a local area network gateway and extracts control data symbols from a predetermined subset of pilot symbol positions used to carry the control data in the modified LTE downlink frame.

13. The data sink as claimed in claim 12 further comprising an antenna connected to a TV white space receiver that receives the modified LTE downlink frames.

14. The data sink as claimed in claim 13 further comprising a channel estimator that computes channel estimations using pilot symbols transmitted on pilot positions in a modified downlink frame not included in the predetermined subset.

15. The data sink as claimed in claim 14 wherein the channel estimator further comprises channel estimation interpolation algorithms that interpolate the computed channel estimations in the frequency domain and the time domain to provide a channel estimate at each received symbol position in the modified LTE downlink frame.

16. A method of data communications in a wireless local area network, comprising:
transmitting within the wireless local area network modified Long Term Evolution (LTE) downlink frames in which a predetermined subset of the pilot symbol positions otherwise used in LTE downlink frames to transmit pilot symbols for channel estimation are used to carry control data symbols to increase a data capacity of each of the LTE downlink frames; and
on receipt at a data sink in the wireless local area network of one of the modified LTE downlink frames, demodulating the modified LTE downlink frame and extracting the control data symbols from the predetermined subset of the pilot symbol positions.

17. The method as claimed in claim 16 further comprising transmitting the modified LTE downlink frames using available TV whitespace spectrum.

18. The method as claimed in claim 17 further comprising sensing TV band over-the-air signals and selecting unused TV white space spectrum for transmitting the modified LTE downlink frames.

19. The method as claimed in claim 18 further comprising inserting at least one source data packet into the modified LTE downlink frame.

20. The method as claimed in claim 19 wherein after extracting the control data symbols from the predetermined subset of the pilot symbol positions, the data sink inspects the modified LTE downlink frame for a source data packet.

* * * * *